(12) United States Patent  
Ichikawa et al.

(10) Patent No.: US 8,536,739 B2  
(45) Date of Patent: Sep. 17, 2013

(54) POWER TRANSFER SYSTEM AND NONCONTACT CHARGING DEVICE

(75) Inventors: Keiichi Ichikawa, Nagaokakyo (JP); Henri Bondar, Kyoto (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 59 days.

(21) Appl. No.: 13/334,158

(22) Filed: Dec. 22, 2011

(65) Prior Publication Data

US 2012/0146431 A1    Jun. 14, 2012

Related U.S. Application Data

(63) Continuation of application No. PCT/JP2009/002923, filed on Jun. 25, 2009.

(51) Int. Cl.  
*H01F 38/00* (2006.01)

(52) U.S. Cl.  
USPC .......................................................... 307/104

(58) Field of Classification Search  
USPC .......................................................... 307/104  
See application file for complete search history.

(56) References Cited

U.S. PATENT DOCUMENTS

| 6,040,773 A | 3/2000 | Vega et al. |
| 6,411,213 B1 | 6/2002 | Vega et al. |
| 6,611,199 B1 | 8/2003 | Geiszler et al. |
| 8,242,638 B2 | 8/2012 | Camurati et al. |

FOREIGN PATENT DOCUMENTS

| CN | 101416411 A | 4/2009 |
| DE | 103 04 584 | 8/2004 |
| JP | 2005-79786 | 3/2005 |
| JP | 2009-89520 | 4/2009 |
| WO | WO-97/14112 A1 | 4/1997 |
| WO | WO 2007/107642 | 9/2007 |

OTHER PUBLICATIONS

PCT/JP2009/002923 International Search Report dated Sep. 18, 2009.  
PCT/JP2009/002923 Written Opinion dated Sep. 18, 2009.

*Primary Examiner* — Rexford Barnie  
*Assistant Examiner* — Dru Parries  
(74) *Attorney, Agent, or Firm* — Dickstein Shapiro LLP

(57) ABSTRACT

A power transfer system includes a power transmission device and a power reception device. A central conductor and a peripheral conductor are formed near the upper surface of a casing of the power transmission device. The peripheral conductor surrounds the central conductor in an insulated state from the central conductor. An alternating voltage generating circuit is provided for the power transmission device and applies an alternating voltage between the central conductor and the peripheral conductor. A central conductor and a peripheral conductor are formed near the lower surface of a casing of the power reception device. The peripheral conductor surrounds the central conductor in an insulated state from the central conductor. A load circuit is provided for the power reception device, and a voltage induced between the central conductor and the peripheral conductor is applied to the load circuit.

18 Claims, 16 Drawing Sheets

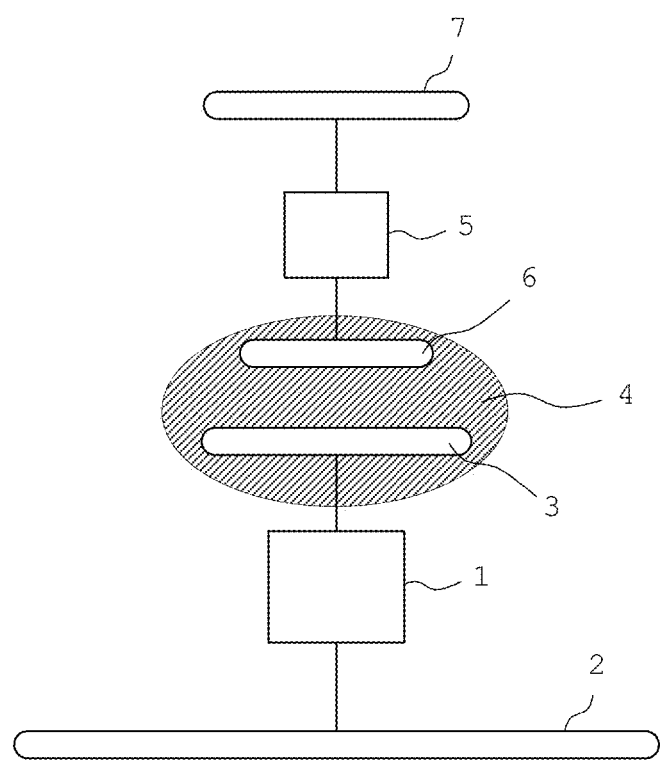

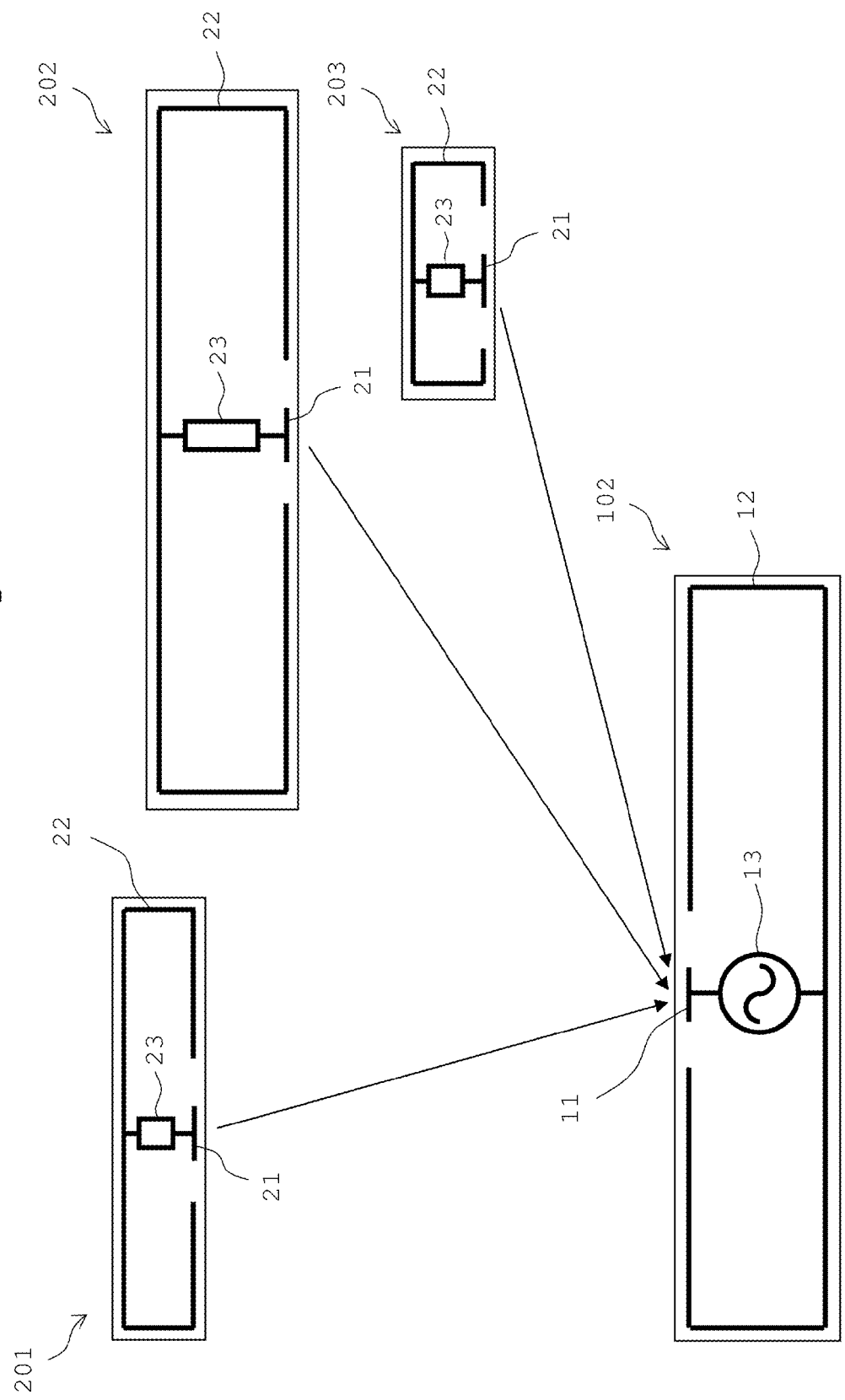

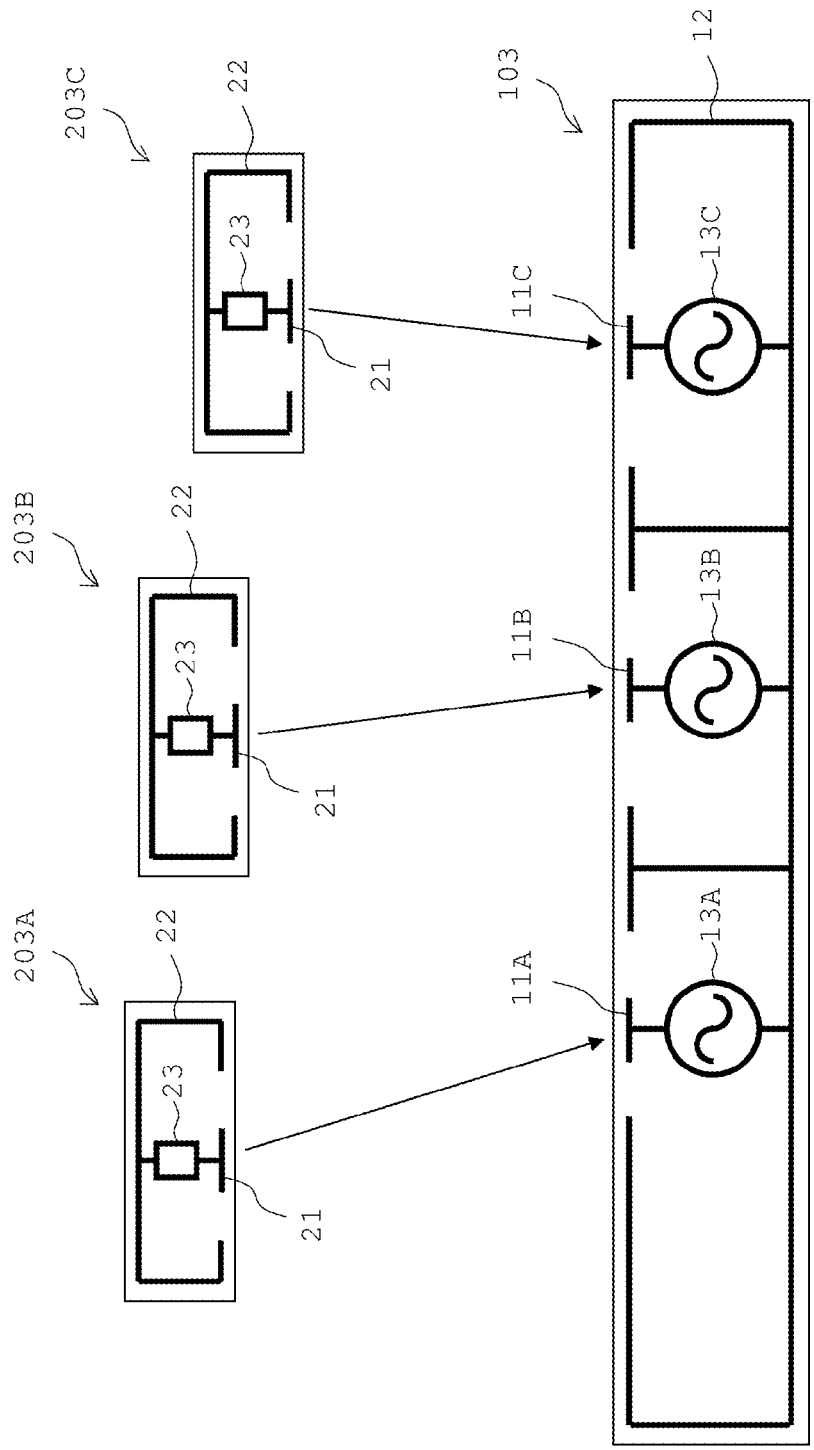

POWER TRANSFER SYSTEM AND NONCONTACT CHARGING DEVICE

CROSS REFERENCE TO RELATED APPLICATIONS

The present application is a continuation of International application No. PCT/JP/2009/002923, filed Jun. 25, 2009, the entire contents of which is incorporated herein by reference.

FIELD OF THE INVENTION

The invention relates to a power transfer system that transfers electric power in a noncontact manner and a noncontact charging device that uses the power transfer system.

BACKGROUND OF THE INVENTION

Patent Document 1 and Patent Document 2 describe existing techniques related to a noncontact power transfer system. The power transfer system described in Patent Document 1 increases the efficiency of power transfer between a card reader/writer and a noncontact-type card. Two electrodes are provided for each of the card reader/writer and the noncontact-type card. When power is transferred, the electrodes of the card reader/writer face the electrodes of the noncontact-type card in a pair to transfer electric power through capacitive coupling.

The power transfer system described in Patent Document 1 transfers electric power by forming a symmetric electric dipole, while the power transfer system described in Patent Document 2 transfers electric power through mutual electrostatic induction in such a manner that asymmetric electric dipoles are formed to face coupling electrodes to each other at a short distance.

FIG. 1 is a view that shows the basic configuration of the power transfer system described in Patent Document 2. A power transmission device includes a high-frequency high-voltage generator 1, a passive electrode 2 and an active electrode 3. A power reception device includes a high-frequency high-voltage load 5, a passive electrode 7 and an active electrode 6. Then, the active electrode 3 of the power transmission device is located in proximity to the active electrode 6 of the power reception device via a gap 4 to capacitively couple these two electrodes.

PTL 1—Japanese Unexamined Patent Application Publication No. 2005-079786

PTL 2—Pamphlet of International Publication No. 2007/107642

SUMMARY OF THE INVENTION

However, in the power transfer system described in Patent Document 1, it is necessary to face the two electrodes of the power transmission device to the two electrodes of the power reception device. Thus, the power transmission device and the power reception device are arranged in a prescribed positional relationship. Therefore, there is a problem that the flexibility of arrangement of both the power transmission device and the power reception device is considerably low. In addition, the electrodes of each of the power transmission device and the power reception device have a symmetric configuration, and are isolated from a ground electrode of the circuit. Therefore, there is a problem that a voltage applied to each electrode increases. Furthermore, because the periphery of each electrode is not shielded, there is a problem that an unnecessary electric field (that does not contribute to power transfer) spreads around the electrodes.

In the power transfer system described in Patent Document 2, only the active electrodes face each other. Thus, A lower coupling is occurred and larger voltage is necessary for same distance and power conditions. When the active electrodes are larger to increase flexibility in positioning the electric field is not confined only in between the two facing parts of the active electrodes. Furthermore, there is a problem that, when alternative voltage of the passive electrode at the power reception device side are large, an electric field also similarly spreads therearound.

It is an object of the invention to provide a power transfer system that increases the flexibility of relative positional relationship between a power transmission device and a power reception device, that decreases a voltage applied to coupling electrodes, and that reduces spreading of an unnecessary electric field.

According to preferred embodiments of the invention, a power transfer system is configured as follows. A power transfer system includes: a power transmission device and a power reception device, each of which has a capacitive coupling electrode that is capacitively coupled to the capacitive coupling electrode of the device at the other side, wherein the capacitive coupling electrode of each of the power transmission device and the power reception device includes a central conductor (=high-voltage side active electrode) and a peripheral conductor (=low-voltage side passive electrode) that is arranged at a position surrounding the central conductor or at positions placing the central conductor in between in an insulated state from the central conductor, the power transmission device includes an alternating voltage generating circuit that generates an alternating voltage that is applied between the central conductor and peripheral conductor of the power transmission device, and the power reception device includes a load circuit of electric power induced between the central conductor and peripheral conductor of the power reception device.

Thus, it is possible to increase a capacitance between the peripheral conductors, so the degree of coupling increases, power transfer efficiency may be improved, and the size of the device may be reduced. In addition, because the power transfer efficiency is improved, it is possible to increase an upper limit of electric power that can be transferred. In addition, because the degree of coupling increases, it is possible to decrease a set voltage applied to the central conductor of the power transmission device. In accordance with this, it is possible to decrease the electric potential of the central conductor of the power reception device. Furthermore, the central conductor is electrostatically shielded with a structure such that the peripheral conductor surrounds the central conductor, so an unnecessary radiation may be reduced.

According to preferred embodiments of the invention, the peripheral conductor of any one of the power transmission device and the power reception device is typically a casing that is electrically continuous with a reference electric potential (ground) of any one of the power transmission device and the power reception device. With the above structure, it is possible to standardize the central conductor and the casing of the device, thus making it possible to simplify the configuration of an apparatus. In addition, the metal casing may be directly used as the peripheral conductor.

According to preferred embodiments of the invention, in a state where the power transmission device and the power reception device are placed in a predetermined positional relationship, a capacitance between the central conductor of the power transmission device and the central conductor of the power reception device is larger than a capacitance between the central conductor and peripheral conductor of each of the power transmission device and the power reception device.

According to preferred embodiments of the invention, the central conductor and the corresponding peripheral conductor are formed substantially in the same plane. According to preferred embodiments of the invention, an engagement device is provided for each of casings of the power transmission device and power reception device, wherein the engagement devices engage with each other in a predetermined positional relationship.

According to preferred embodiments of the invention, at least one of the power transmission device and the power reception device has a dielectric layer on a surface of at least one of the central conductor and the peripheral conductor.

According to preferred embodiments of the invention, at least one of the power transmission device and the power reception device has the peripheral conductor of which the diameter (minor axis) is about three times as large as the diameter (minor axis) of the central conductor.

According to preferred embodiments of the invention, the central conductor of the power transmission device and the central conductor of the power reception device have different shapes.

According to preferred embodiments of the invention, the central conductor of each of the power transmission device and the power reception device has a substantially linear shape or a substantially partially linear shape, and the corresponding peripheral conductor is formed on each side at substantially a constant distance from the central conductor.

According to preferred embodiments of the invention, the power transmission device includes a low-voltage circuit portion in addition to the alternating voltage generating circuit, and the low-voltage circuit portion is shielded by a shielding conductor that includes the peripheral conductor of the power transmission device.

According to preferred embodiments of the invention, the power reception device includes a low-voltage circuit portion in addition to the rectifying smoothing circuit, and the low-voltage circuit portion is shielded by a shielding conductor that includes the peripheral conductor of the power reception device.

According to preferred embodiments of the invention, the peripheral conductor of any one of the power transmission device and the power reception device is grounded to an earth electric potential or an electric potential that is substantially equal to an earth electric potential.

According to preferred embodiments of the invention, a noncontact charging device includes any one of the above described power transfer system, the load circuit includes a rectifying smoothing circuit that rectifies and smoothes an alternating voltage induced between the central conductor and peripheral conductor of the power reception device and a charging element that is charged with an output from the rectifying smoothing circuit, and the power transmission device is provided with a control circuit that controls the alternating voltage generating circuit to control charging to the charging element or the load circuit is provided with a control circuit that controls the rectifying smoothing circuit to control charging to the charging element.

According to the above preferred embodiments of the invention, the following advantageous effects may be obtained. The allowance to a relative positional deviation between the power transmission device and the power reception device increases to thereby improve convenience. The degree of coupling between the power transmission device and the power reception device increases, power transfer efficiency may be improved, and the size of the device may be reduced. Because the power transfer efficiency is improved, it is possible to increase an upper limit of electric power that can be transferred. Because the degree of coupling increases, it is possible to decrease a set voltage applied to the central conductor of the power transmission device. In accordance with this, it is possible to decrease the electric potential of the central conductor of the power reception device. The central conductor is electrostatically shielded with a structure such that the peripheral conductor surrounds the central conductor, so an unnecessary radiation may be reduced.

BRIEF DESCRIPTION OF THE DRAWINGS

FIG. 1 is a view that shows the basic configuration of a power transfer system described in Patent Document 2.

FIG. 3 is a view that shows an example in which power reception devices having different sizes and/or different shapes are applied to a power transmission device 102 in a power transfer system according to a first embodiment.

FIG. 4 is an example in which a single power transmission device 103 is used to transfer electric power to a plurality of power reception devices 203A, 203B, and 203C at the same time or individually.

DETAILED DESCRIPTION OF THE INVENTION

[First Embodiment]

Figure 2A:
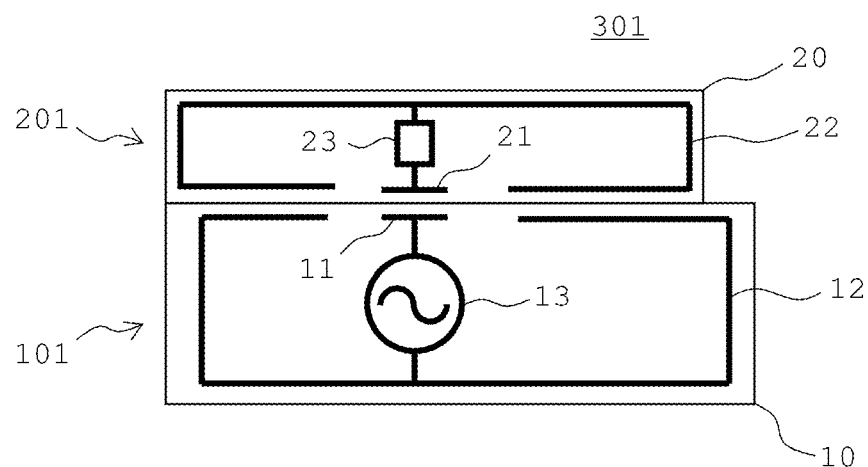
FIG. 2A is a cross-sectional view that conceptually shows a relevant portion of a power transfer system 301.

The configuration of a power transfer system according to a first embodiment will be described with reference to FIG. 2A to FIG. 4. FIG. 2A is a cross-sectional view that conceptually shows a relevant portion of a power transfer system 301. The power transfer system 301 includes a power transmission device 101 and a power reception device 201. A central conductor 11 and a peripheral conductor 12 are formed near the upper surface of a casing 10 of the power transmission device 101. The peripheral conductor 12 surrounds the central conductor 11 in an insulated state from the central conductor 11. In addition, an alternating voltage generating circuit 13 is provided inside the casing 10 of the power transmission device 101 and applies an alternating voltage between the central conductor 11 and the peripheral conductor 12. In this example, the peripheral conductor 12 is arranged along the outer peripheral surface of the casing 10. Thus, the alternating voltage generating circuit 13 is covered with the peripheral conductor 12.

A central conductor 21 and a peripheral conductor 22 are formed near the lower surface of a casing 20 of the power reception device 201. The peripheral conductor 22 surrounds the central conductor 21 in an insulated state. In addition, a load circuit 23 is provided inside the casing 20 of the power reception device 201, and a voltage induced between the central conductor 21 and the peripheral conductor 22 is applied to the load circuit 23. In this example, the peripheral conductor 22 is arranged along the outer peripheral surface of the casing 20. Thus, the load circuit 23 is covered with the peripheral conductor 22.

When the power reception device 201 is arranged with respect to the power transmission device 101 so that the central conductor 11 of the power transmission device 101 faces the central conductor 21 of the power reception device 201, the peripheral conductor 12 formed near the upper surface of the power transmission device 101 faces the peripheral conductor 22 formed near the lower surface of the power reception device 201.

The faces of the casings, on which the central conductors 11 and 21 are formed (formed near the surfaces), are active areas of the power transmission device 101 and the power reception device 201. A capacitance is generated at a portion at which the central conductor 11 faces the central conductor 21, and a capacitance is generated between the peripheral conductor 12 and the peripheral conductor 22, particularly, at the facing portion on the active surfaces. That is, the central conductors 11 and 21 and the peripheral conductors 12 and 22 operate as capacitive coupling electrodes.

The alternating voltage generating circuit 13 is a circuit that uses a coil transformer, a piezoelectric transformer, an LC resonant circuit, or the like, to generate a high-frequency high-voltage of, for example, about 100 kHz to several tens of MHz. The load circuit 23 includes a rectifying smoothing circuit and a low-voltage circuit that operates on a voltage output from the rectifying smoothing circuit. The rectifying smoothing circuit is formed of a diode bridge circuit and a smoothing capacitor. In the case of an alternating load, the alternating load is supplied with an alternating voltage using a step-down transformer or a voltage dividing circuit that directly decreases an alternating voltage without rectifying.

The peripheral conductor 12 of the power transmission device 101 has a reference potential (ground potential) of the alternating voltage generating circuit 13. In addition, the peripheral conductor 22 of the power reception device 201 has a reference potential (ground potential) of the load circuit 23. Thus, the central conductors 11 and 21 operate as high-voltage side active electrodes, while the peripheral conductors 12 and 22 operate as low-voltage side passive electrodes.

The power transfer system according to the embodiment of the invention has basic principles on short-range energy transfer using a alternative electromagnetic field (quasi-static electric field). When a wavelength lambda is sufficiently longer than the size or operating range (distance d) of an electric field oscillating source, that is, when the relationship $$d/\mathrm{lambda} \ll 1$$

is satisfied, a quasi-static electric field stays (is bound) near the electric field oscillating source. Thus, a radiant quantity to a distant place is vanishingly small.

Note that electromagnetic waves have transverse modes (fields propagates in a direction perpendicular to both fields), whereas, in a power transfer that uses a quasi-static electric field as in the case of the embodiment of the invention, energy is transferred in the same direction as an electric field. In a low-frequency band in which a quasi-static electric field is handled, That is, the figure "Z=V/I" is available. ("Z" is an impedance, "V" is a voltage, "I" is a current)

The casings 10 and 20 are, for example, plastics, such as ABS resin. By integrally forming a conductor layer inside the plastic casing, the outer surface of each casing may be electrically insulated. Thus, if a high voltage higher than or equal to about several hundreds of volts is applied to the central conductor 11, safety may be ensured.

In addition, the central conductor and the peripheral conductor of the active surface are formed substantially in the same plane. Thus, it is easy to form the central conductors 11 and 21 and the peripheral conductors 12 and 22 on the active surfaces. Hence, it is possible to maintain a constant gap between the facing electrodes and, as a result, it is possible to stabilize power transfer characteristic.

Figure 2B:
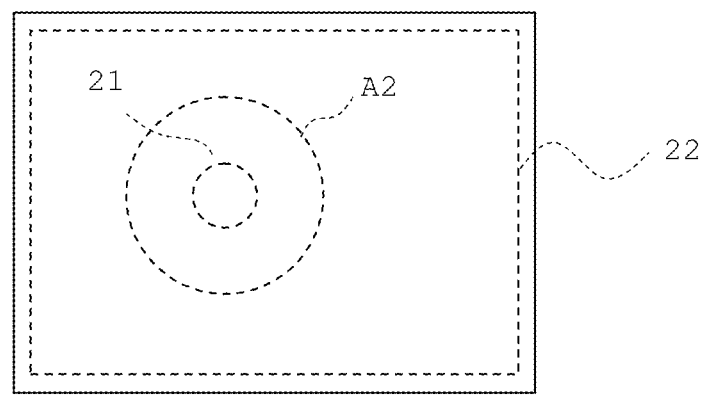
FIG. 2B is a bottom side view of a power reception device 201.
Figure 2C:
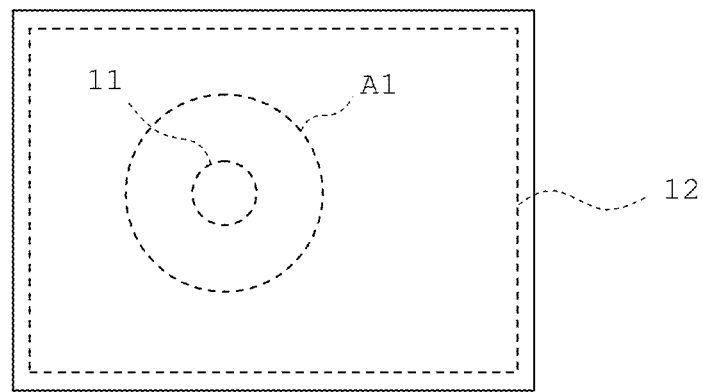
FIG. 2C is a top view of a power transmission device 101.

FIG. 2B is a bottom side view of the power reception device 201. FIG. 2C is a top view of the power transmission device 101. The central conductor 11 of the power transmission device 101 has a substantially circular shape. The peripheral conductor 12 has a substantially circular opening A1 that is coaxial with the central conductor 11. That is, the peripheral conductor 12 is arranged at a position surrounding the central conductor 11 in an insulated state from the central conductor 11. In the power reception device 201 as well, the central conductor 21 has a substantially circular shape. The peripheral conductor 22 has a substantially circular opening A2 that is coaxial with the central conductor 21. The peripheral conductor 22 is arranged at a position surrounding the central conductor 21 in an insulated state from the central conductor 21.

In this example, the central conductors 11 and 21 have substantially the same size. In addition, the openings A1 and A2 of the respective peripheral conductors also have substantially the same size.

In this way, when the facing areas of the peripheral conductors are larger than the areas of the central conductors, the coupling capacitance of the peripheral conductors, which are the passive electrodes, is larger than the coupling capacitance of the central conductors, which are the active electrodes. For this reason, the path of a return electric current (electric current path through capacitive coupling) is ensured to stabilize power transfer. In addition, because a voltage applied to the peripheral conductor decreases depending on a voltage division ratio of the capacitively divided voltages, it is possible to ensure safety even when power transfer increases.

Figure 2D:
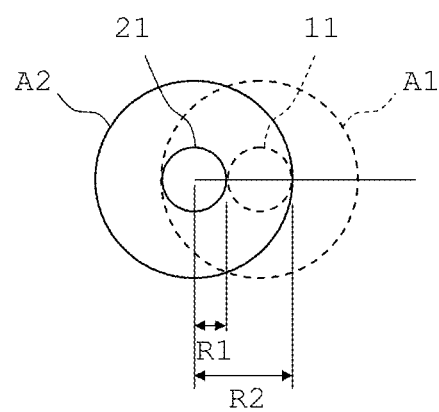
FIG. 2D is a view that shows the relationships between the sizes of central conductors 11 and 21 and the sizes of openings A1 and A2 of peripheral conductors 12 and 22.

FIG. 2D is a view that shows the relationships between the sizes of the central conductors 11 and 21 and the sizes of openings A1 and A2 of the peripheral conductors 12 and 22. Where the radius of the central conductor 21 of the power reception device 201 is R1, and the radius of the opening A2 of the corresponding peripheral conductor is R2, the following relationship is satisfied $$R1*3 > R2$$

This also applies to the relationship between the central conductor 11 of the power transmission device 101 and the opening A1 of the corresponding peripheral conductor.

By setting the above relationships, as shown in FIG. 2D, when the deviation is smaller than the maximum deviation, the central conductors 11 and 21 at least partially face each other and neither of the central conductors 11 and 21 faces the peripheral conductor 22 or 12 at the other side. Thus, both the central conductors 11 and 21 are capacitively coupled. Note that in a state where the diameters of the two central conductors 11 and 21 are different, even when both the central conductors 11 and 21 are deviated to a limit position at which the central conductors 11 and 21 do not face each other, the allowance to a deviation with respect to a horizontal plane increases by setting the relationship such that neither of the central conductors 11 and 21 faces the peripheral conductor 22 or 12 at the other side.

In addition, a gap between the central conductor 11 and peripheral conductor 12 of the power transmission device 101 and a gap between the central conductor 21 and peripheral conductor 22 of the power reception device 201 are wider than a gap between the facing central conductors 11 and 21. By so doing, it is possible to suppress an unnecessary capacitance (stray capacitance) between the central conductor 11 and the peripheral conductors 12 and 22 and between the central conductor 21 and the peripheral conductors 12 and 22, thus making it possible to increase the degree of coupling.

The central conductors 11 and 21 and the openings A1 and A2 of the peripheral conductors have a substantially circular shape, and an acute angle portion is removed as much as possible. Thus, an electric field does not concentrate, and an upper limit voltage, at which a local corona discharge onset occurs, is high.

In the structures shown in FIG. 2A to FIG. 3, numerical specific examples are as follows. The alternating voltage generating circuit 13 generates a high voltage within the range of about several hundreds of volts to about several kilovolts. It is desirable to set the high voltage at about 3 kV or below in order to prevent local corona discharge onset. The frequency is determined within the range of about 100 kHz to about 10 MHz. When the frequency is equal to or higher than a certain frequency, electromagnetic waves are radiated from the central conductors 11 and 21. Thus, the upper limit of the frequency is restricted because of a radiation loss of electromagnetic waves.

When transferred power is lower than or equal to about 50 W, the size of the central conductor 11 of the power transmission device 101 is about diameter 10 mm to about 30 mm as a measure. The size of each of the central conductors 11 and 21 is determined on the basis of restrictions, such as a necessary transferred power, a power transfer efficiency, and the physical shape of a product. For example, when a power larger than or equal to about 50 W is handled, the size of an electrode may be equal to or larger than about diameter 30 mm, whereas, when a minute power is handled, the size of an electrode may be smaller than or equal to about 10 mm. The above described various conditions are used in a specific case, and are not limited to these values or ranges.

FIG. 3 is a view that shows an example in which power reception devices having different sizes and/or different shapes are applied to a power transmission device 102 in the power transfer system according to the first embodiment. The basic configuration of the power transmission device 102 is similar to that shown in FIG. 2A, and includes a central conductor 11, a peripheral conductor 12 and an alternating voltage generating circuit 13.

The respective configurations of three power reception devices 201, 202 and 203 are basically similar to that of the power reception device 201 shown in FIG. 2A, and each include a central conductor 21, a peripheral conductor 22 and a load circuit 23. However, the sizes of the entire power reception devices 201, 202 and 203 are different.

In this way, even when the sizes of the power reception devices 201, 202 and 203 are different, in a state where the active surface of each of the power reception devices 201, 202 and 203 is located in proximity to the active surface of the power transmission device 102, when the central conductor 21 of the power reception device faces (is opposite) the central conductor 11 of the power transmission device 102, and the peripheral conductor 22 of the active surface of each of the power reception devices 201, 202 and 203 faces the peripheral conductor 12 of the active surface (upper surface in the drawing) of the power transmission device 102, power transfer is possible in a similar manner. Thus, by standardizing the power transmission device 102, the power transmission device 102 may be shared by a plurality of power reception devices having different sizes. Note that the central conductors 21 of the plurality of power reception devices 201, 202 and 203 having different sizes do not necessarily have substantially the same size as the central conductor 11 of the power transmission device 102; the respective sizes may be different depending on the degree of coupling, or the like.

FIG. 4 is an example in which a single power transmission device 103 is used to transfer electric power to a plurality of power reception devices 203A, 203B, and 203C at the same time or individually. The power transmission device 103 includes a plurality of central conductors 11A, 11B and 11C and a peripheral conductor 12 having openings respectively surrounding those central conductors 11A, 11B and 11C. In addition, alternating voltage generating circuits 13A, 13B and 13C are respectively connected between the central conductors 11A, 11B and 11C and the peripheral conductor 12. The peripheral conductor 12 operates as a ground electrode common to these three alternating voltage generating circuits 13A, 13B and 13C.

The configurations of the power reception devices 203A, 203B and 203C are basically similar to that of the power reception device 201 shown in FIG. 2A, and each include a central conductor 21, a peripheral conductor 22 and a load circuit 23. In this example, the power reception devices 203A, 203B and 203C are placed so that the central conductors 21 of the power reception devices 203A, 203B and 203C respectively face the central conductors 11A, 11B and 11C of the power transmission device 103. Thus, it is possible to transfer electric power respectively to the three power reception devices 203A, 203B and 203C.

[Second Embodiment]

Figure 5:
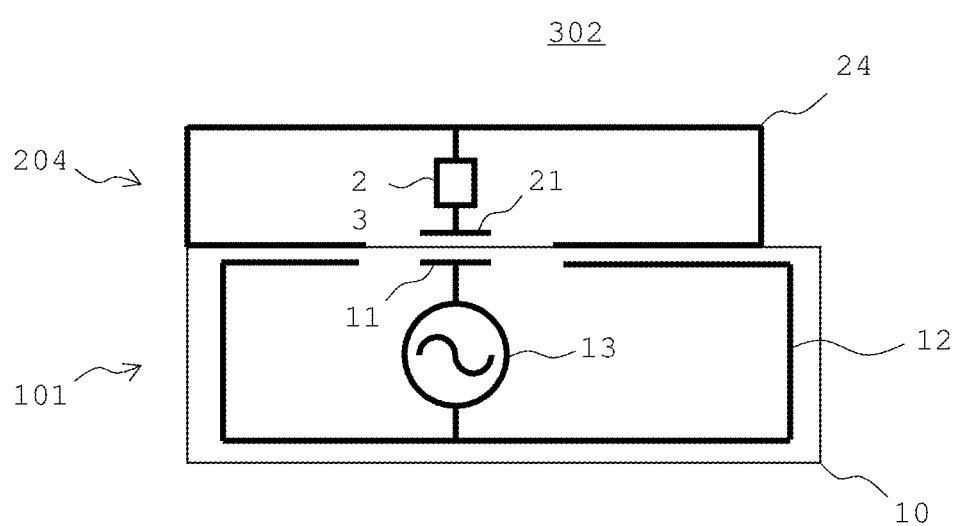
FIG. 5 is a cross-sectional view that conceptually shows a relevant portion of a power transfer system 302 according to a second embodiment.

FIG. 5 is a cross-sectional view that conceptually shows a relevant portion of a power transfer system 302 according to a second embodiment. The power transfer system 302 includes a power transmission device 101 and a power reception device 204.

The configuration of the power transmission device 101 is similar to that of the power transmission device 101 shown in FIG. 2A, and includes a central conductor 11, a peripheral conductor 12 and an alternating voltage generating circuit 13 inside a casing 10.

On the other hand, the power reception device 204 includes a central conductor 21, a metal casing 24 and a load circuit 23. The power reception device 204 differs from the power reception device 201 shown in FIG. 2A in that a metal casing 24 of the power reception device 204 shown in FIG. 5A also serves as a peripheral conductor. The central conductor 21 is arranged so that the central conductor 21 is not exposed to an outer surface in an insulated state from the metal casing 24.

Incidentally, in the case of the existing power transfer system that uses electromagnetic induction, an eddy current occurs in the metal casing, so it is impossible to transfer electric power. In the embodiment of the invention, the metal casing may be effectively used, and it is possible to efficiently transfer electric power.

Figure 6:
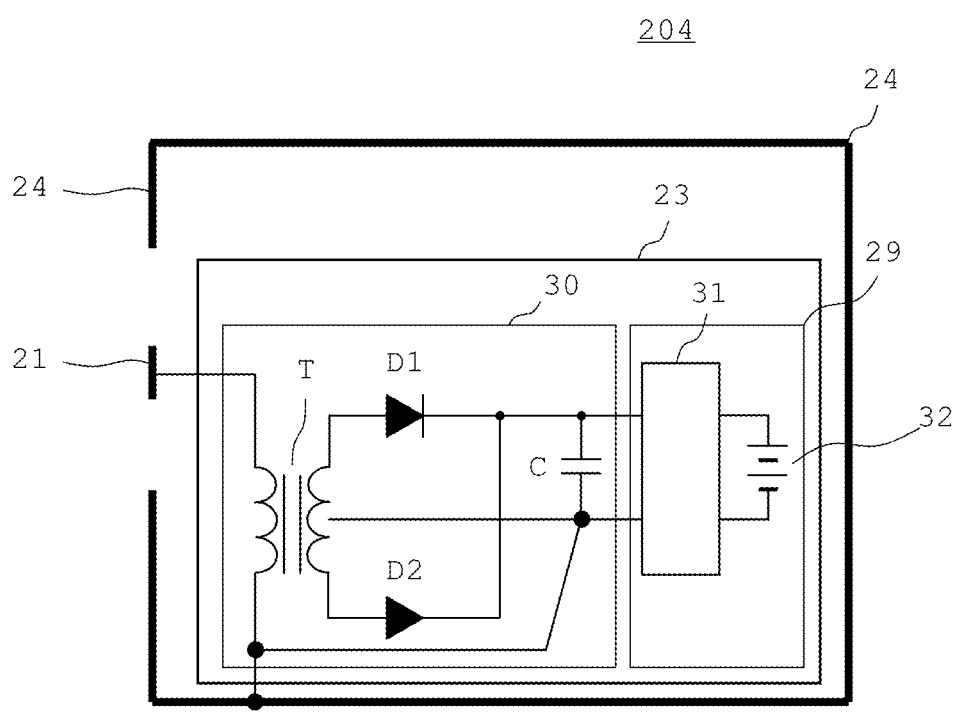
FIG. 6 is a view that shows the circuit configuration of a load circuit 23 provided inside a power reception device 204 shown in FIG. 5.

FIG. 6 is a view that shows the circuit configuration of the load circuit 23 provided inside the power reception device 204 shown in FIG. 5. The load circuit 23 includes a rectifying smoothing circuit 30 and a low-voltage circuit portion 29. The rectifying smoothing circuit 30 includes a step-down transformer T, rectifier diodes D1 and D2 and a smoothing capacitor C. One end of a primary coil of the transformer T is connected to the central conductor 21, and the other end is connected to a ground (metal casing 24). A full-wave rectifying circuit including the rectifier diodes D1 and D2 and the smoothing capacitor C is formed in a secondary coil of the transformer T.

A resonant circuit may be formed in the rectifying smoothing circuit 30. Alternatively, a resonant circuit may be provided upstream of or downstream of the rectifying smoothing circuit 30. The following advantageous effect may be obtained by providing a resonant circuit. The power transmission device 101 and the power reception device 204 are coupled to each other at a degree of coupling k (k<1). When no resonant circuit is incorporated, uncoupled energy will be a loss. That is, the power transfer efficiency is low. When a resonant circuit is provided, it is possible to store uncoupled energy in the resonant circuit as reactive energy. This may be understood that an energy loss in the case of no resonant circuit is recycled. In addition, it may also be understood that the Q factor of the resonant circuit increases an equivalent coupling coefficient. As a result, the power transfer efficiency may be improved. Particularly, when the degree of coupling is weak (k<<1), the advantageous effect appears remarkably.

In this example, the power transfer system 302 constitutes a noncontact charging device, and the low-voltage circuit portion 29 includes a control circuit 31 and a secondary battery 32, which operate on a voltage rectified and smoothed by the rectifying smoothing circuit 30 as a power supply. The control circuit 31 controls charging of the secondary battery 32, controls charging using the secondary battery 32 as a power supply, and carries out a predetermined circuit operation other than those.

Note that it is also applicable that a device for monitoring the state of charge of the secondary battery 32 through communication is provided, and a circuit for controlling charging of the secondary battery 32 is provided at the power transmission device 101 side. The above described configuration may be similarly applied to a charging element, such as an electric double layer, other than the secondary battery.

[Third Embodiment]

FIG. 7A to FIG. 7D are views that show the configurations of four power transfer systems 303, 304, 305, and 306 according to a third embodiment. The power transfer system 303 shown in FIG. 7A includes a power transmission device 104 and a power reception device 205. As in the case of the examples shown in the first and second embodiments, the power transmission device 104 includes a central conductor 11, a peripheral conductor 12 and an alternating voltage generating circuit 13 inside a casing 10. In addition, the power reception device 205 includes a central conductor 21, a peripheral conductor 22 and a load circuit 23 inside a casing 20. A convex portion 10S is formed on the active surface of the casing 10 of the power transmission device 104. A concave portion 20D is formed on the active surface of the casing 20 of the power reception device 205.

The convex portion 10S and the concave portion 20D are formed so that the central conductor 11 of a power transmission device 104 side faces the central conductor 21 of the power reception device 205 side in a state where the concave portion 20D of the power reception device 205 is engaged with the convex portion 10S of the power transmission device 104.

Figure 7A:
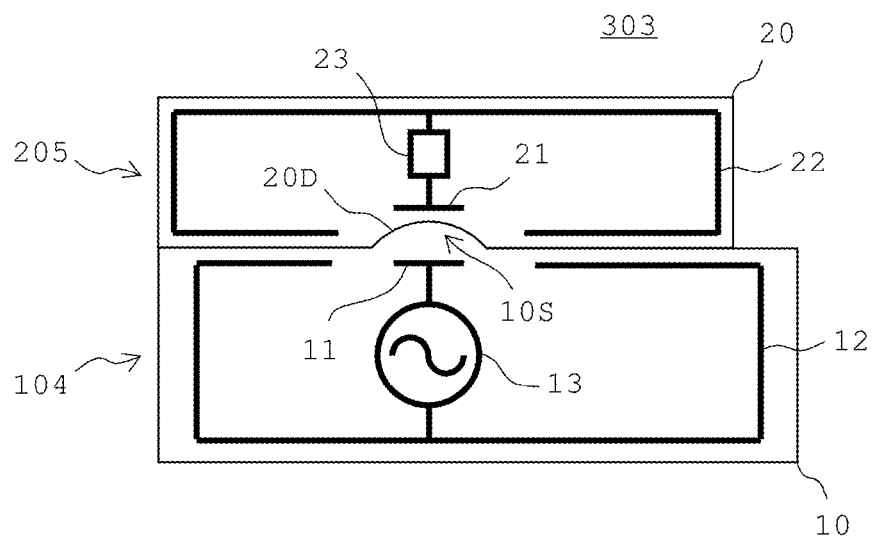
FIG. 7A is a view that shows the configuration of a power transfer systems 303 according to a third embodiment.
Figure 7B:
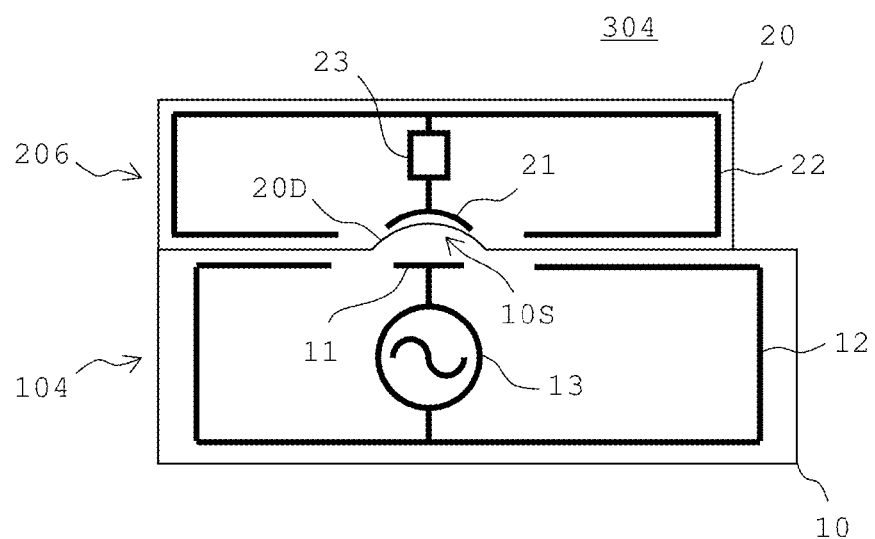
FIG. 7B is a view that shows the configuration of a power transfer systems 304 according to a third embodiment.

In the example of the power transfer system 304 shown in FIG. 7B, the central conductor 21 of a power reception device 206 is curved along the concave portion 20D. The other configuration is similar to that of FIG. 7A. In this way, by arranging the central conductor 21 near the surface along the concave portion 20D of the casing 20, it is possible to increase (gain) a capacitance generated between the central conductor 21 and the central conductor 11 at the other side.

Figure 7C:
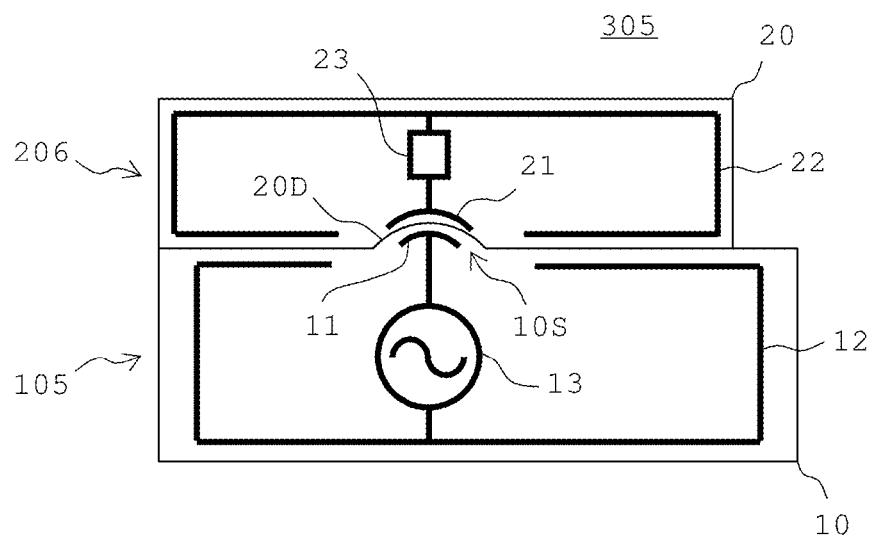
FIG. 7C is a view that shows the configuration of a power transfer systems 305 according to a third embodiment.

In the example of the power transfer system 305 shown in FIG. 7C, the central conductor 11 of a power transmission device 105 is curved along the convex portion 10S. The other configuration is similar to that of FIG. 7B. In this way, by arranging the central conductor 11 near the surface along the convex portion 10S of the casing 10, it is possible to further increase a capacitance generated between the central conductor 11 and the central conductor 21 at the other side.

Figure 7D:
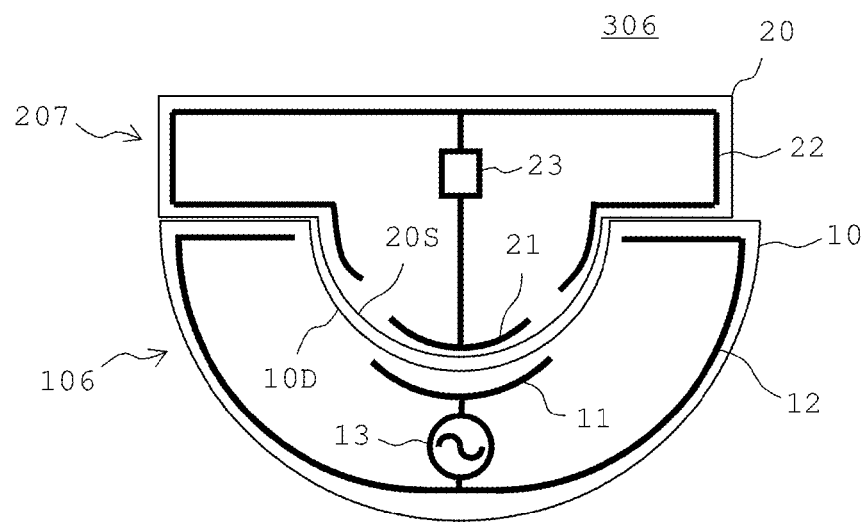
FIG. 7D is a view that shows the configuration of a power transfer systems 306 according to a third embodiment.

In the example of the power transfer system 306 shown in FIG. 7D, a concave portion 10D is formed in the casing 10D of a power transmission device 106, and a convex portion 20S is formed on the active surface of the casing 20 of a power reception device 207. In this way, the convex-concave relationship may be opposite.

[Fourth Embodiment]

Figure 8A:
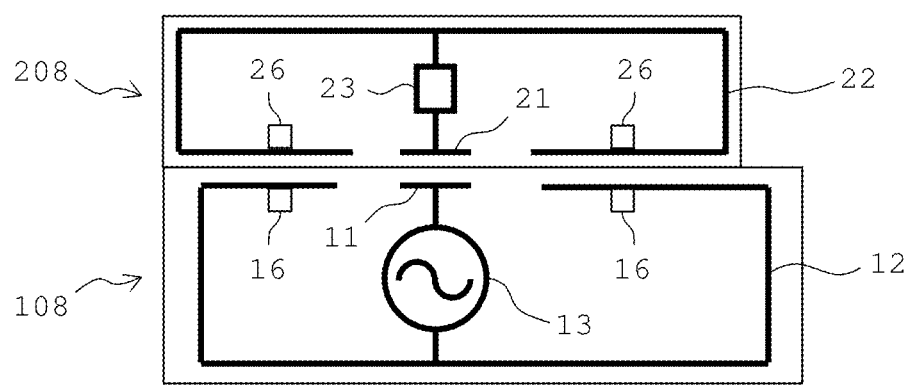
FIG. 8A is a view that shows an example of a power transfer system according to a fourth embodiment.
Figure 8B:
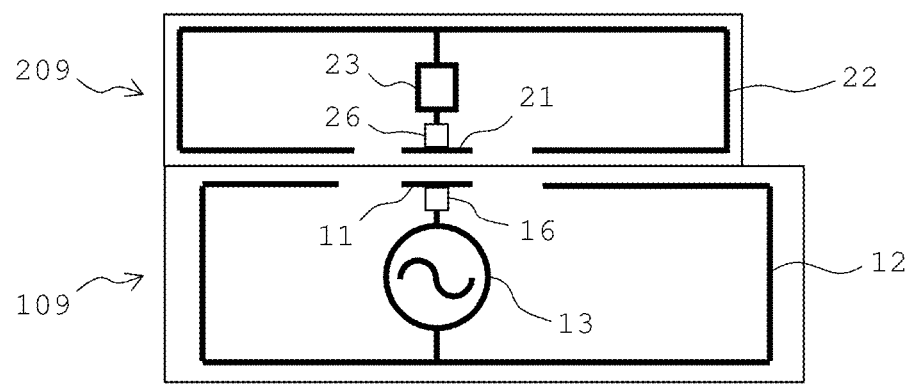
FIG. 8B is a view that shows an example of a power transfer system according to a fourth embodiment.

FIG. 8A and FIG. 8B are views that show examples of two power transfer systems according to a fourth embodiment. A power transfer system 307 shown in FIG. 8A includes a power transmission device 108 and a power reception device 208. A magnet 16 is arranged in proximity to the active surface of the power transmission device 108. A magnet 26 is arranged at the active surface of the power reception device 208. When the power reception device 208 is placed on the power transmission device 108, these magnets 16 and 26 are arranged so that mutual magnets are attracted to each other at positions at which both central conductors 11 and 21 face each other.

The active surfaces of the power transmission device 108 and power reception device 208 are flat and have a low frictional coefficient. For this reason, by just placing the power reception device 208 on the power transmission device 108, both central conductors 11 and 21 are automatically fixed at the facing positions because of the attraction of the mutual magnets.

In this way, because positioning is almost automatically carried out by just placing the power reception device 208 on the power transmission device 108, usability improves.

A power transfer system 308 shown in FIG. 8B includes a power transmission device 109 and a power reception device 209. A magnet 16 is arranged in proximity to the active surface of the power transmission device 109. A magnet 26 is arranged at the active surface of the power reception device 209. In this way, by arranging the magnets 16 and 26 in substantially the same axis as those of the central conductors 11 and 21, electric power may be transferred even when the power reception device 209 is rotated about the axis. Thus, the flexibility of arrangement improves by positions around the axis.

Note that it is also applicable that the magnet is provided at any one of the power transmission device side and the power reception device side, a magnetic substance other than the magnet is arranged at the other side, and then attraction force generated between the magnet and the magnetic substance is used.

In addition, a control circuit may be provided to start transferring electric power only when the flux of the magnet detected by a magnetic sensor, or the like, exceeds a predetermined magnetic flux density. By so doing, it is possible to transfer electric power only to a regular power reception device. That is, the magnet may also be used for application of authentication.

[Fifth Embodiment]

Figure 9A:
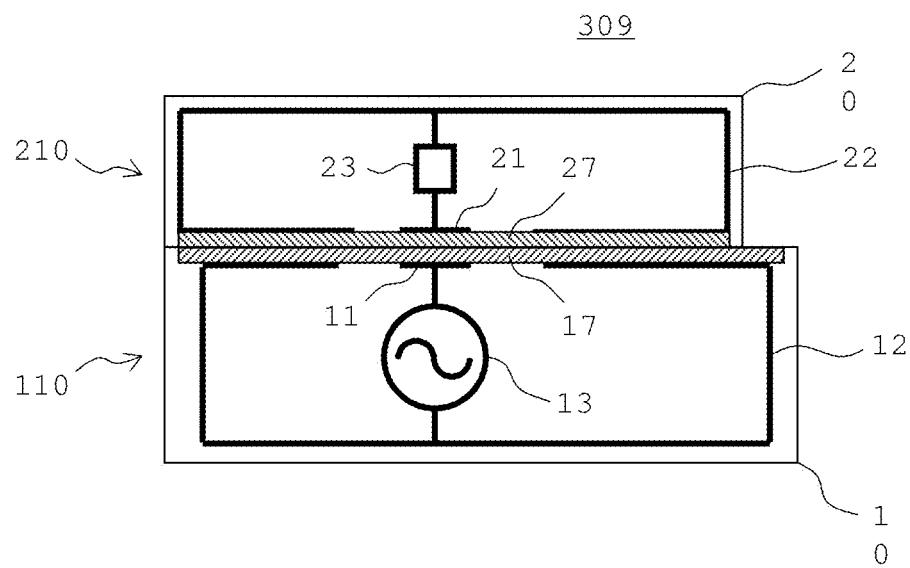
FIG. 9A is a view that shows the configuration of a power transfer system 309 according to a fifth embodiment.
Figure 9B:
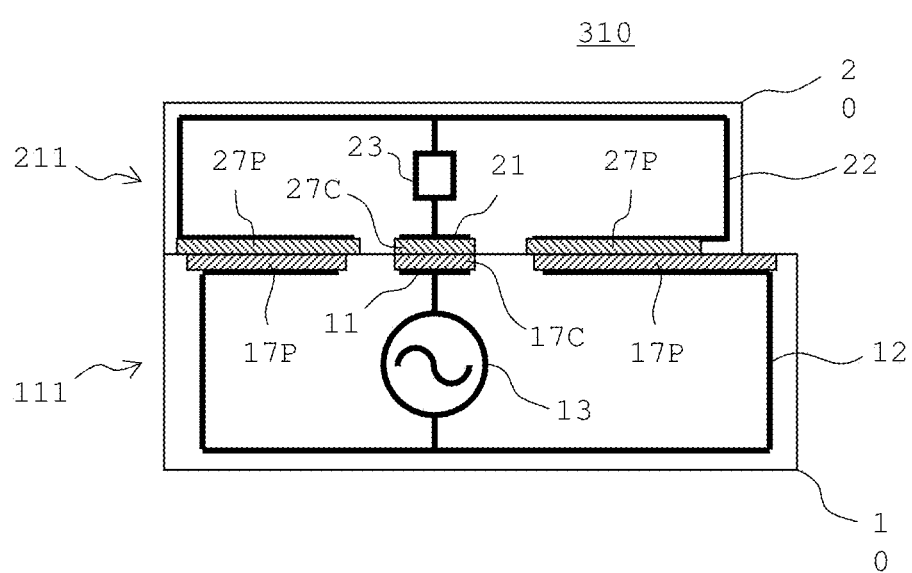
FIG. 9B is a view that shows the configuration of a power transfer system 310 according to a fifth embodiment.

FIG. 9A and FIG. 9B are views that show the configurations of two power transfer systems 309 and 310 according to a fifth embodiment. The power transfer system 309 shown in FIG. 9A includes a power transmission device 110 and a power reception device 210. The respective configurations of the power transmission device 110 and power reception device 210 are basically similar to those of the power transmission device 101 and power reception device 201 shown in FIG. 2A. However, in the example of FIG. 9A, a dielectric sheet 17 is provided on the active surface of the casing 10 of the power transmission device 110. In addition, a dielectric sheet 27 is provided on the active surface of the casing 20 of the power reception device 210. The dielectric sheets 17 and 27 are resin sheets, each having a relative dielectric constant higher than about the relative dielectric constant 2 to 4 of each of the casings 10 and 20, for example, a relative dielectric constant higher than or equal to about 7.

Thus, a capacitance between the central conductor 11 of the power transmission device 110 and the central conductor 21 of the power reception device 210 increases. In addition, a capacitance between the peripheral conductor 12 of the power transmission device 110 and the peripheral conductor 22 of the power reception device 210 increases. Thus, the degree of coupling between the power transmission device 110 and the power reception device 210 increases.

In the power transfer system 310 shown in FIG. 9B, no dielectric sheet is provided at portions corresponding to the openings of the peripheral conductors 12 and 22 around the central conductor 11 of the power transmission device 111 and the central conductor 21 of the power reception device 211, and dielectric sheets 17C, 17P, 27C and 27P are respectively provided at the remaining portions.

In this way, dielectric sheets are interposed only at the portion at which the central conductors of the respective power transmission device 111 and power reception device 211 face and at the portion at which the peripheral conductors face. Thus, it is possible to suppress an unnecessary capacitance (stray capacitance) between the central conductor 11 and the peripheral conductors 12 and 22 and between the central conductor 21 and the peripheral conductors 12 and 22. Therefore, a further high degree of coupling may be obtained.

Note that the dielectric sheets 17C and 17P at the power transmission device 111 side and the dielectric sheets 27C and 27P at the power reception device 211 side each may be formed in such a manner that an annular groove or slit is formed in one dielectric sheet. In addition, the groove or slit may have a cylindrical punched shape or a palisade shape. Furthermore, a low dielectric constant material may be put into the groove or slit.

[Sixth Embodiment]

Figure 10A:
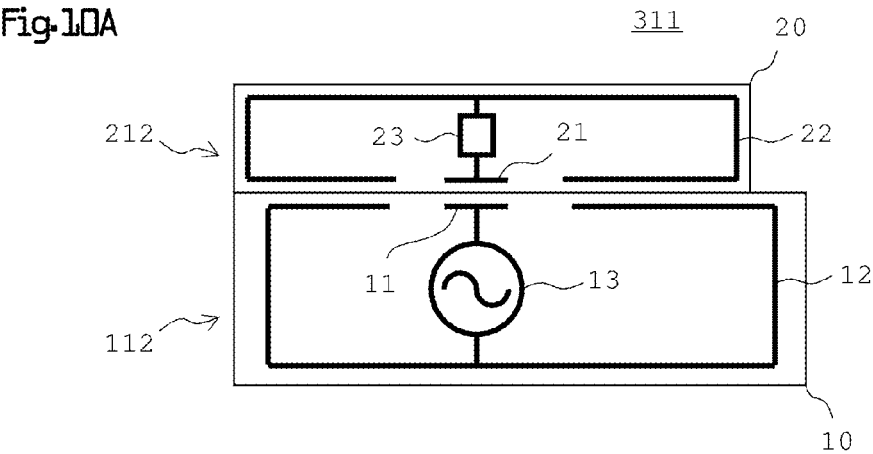
FIG. 10A is a cross-sectional view that conceptually shows a relevant portion of a power transfer system 311.
Figure 10B:
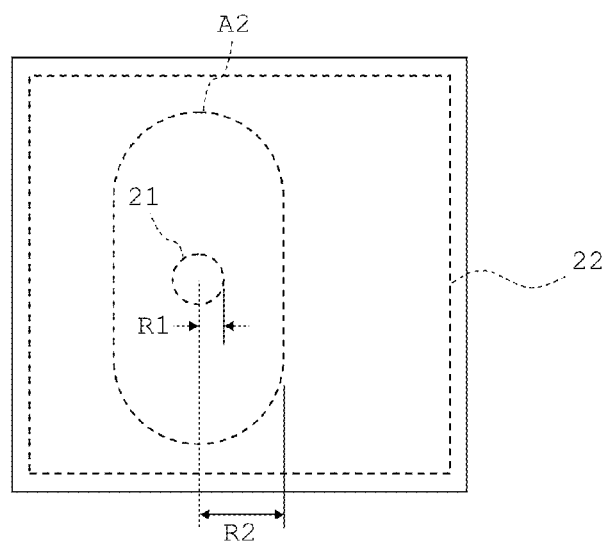
FIG. 10B is a bottom view of a power reception device 212.
Figure 10C:
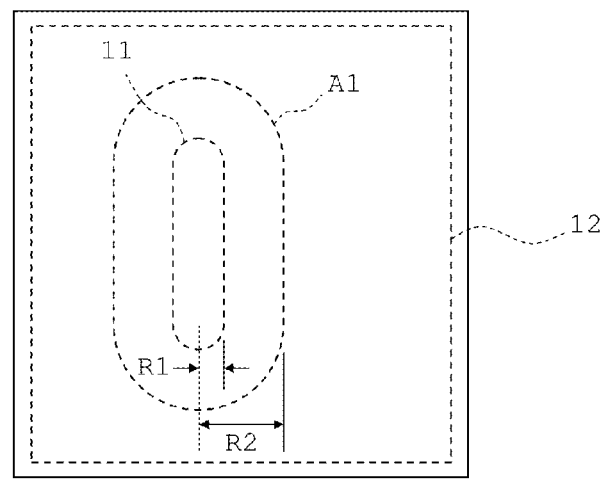
FIG. 10C is a top view of a power transmission device 112.

FIG. 10A is a cross-sectional view that conceptually shows a relevant portion of a power transfer system 311. FIG. 10B is a bottom view of a power reception device 212. FIG. 10C is a top view of a power transmission device 112.

When illustrated in cross-sectional view, the power transfer system 311 is similar to the power transfer system 301 shown in FIG. 2A. The power transfer system 311 includes a power transmission device 112 and a power reception device 212. A central conductor 11 and a peripheral conductor 12 are formed near the upper surface of a casing 10 of the power transmission device 112. The peripheral conductor 12 surrounds the central conductor 11 in an insulated state from the central conductor 11. A central conductor 21 and a peripheral conductor 22 are formed near the lower surface of a casing 20 of the power reception device 212. The peripheral conductor 22 surrounds the central conductor 21 in an insulated state from the central conductor 21. In addition, a load circuit 23 is provided inside the casing 20 of the power reception device 212, and a voltage induced between the central conductor 21 and the peripheral conductor 22 is applied to the load circuit 23.

The central conductor 11 of the power transmission device 112 has an oblong shape having a minor axis of R1 as shown in FIG. 10C, and an opening A1 of the peripheral conductor 12 has an oblong shape having a minor axis of R2 so as to surround the central conductor 11 at a constant distance from the central conductor 11.

On the other hand, the central conductor 21 of the power reception device 212 has a circular shape having a radius of R1, and an opening A2 of the peripheral conductor 22 has an oblong shape having a minor axis of R2.

The major axis of the opening A2 may have a size such that the peripheral conductor 22 of the power reception device 212 does not bridge the central conductor 11 and peripheral conductor 12 of the power reception device 212 even when the central conductor 21 is deviated to an end portion of the central conductor 11 of the power transmission device 112, at which coupling is possible.

With the above configuration, the flexibility of arrangement of the power reception device 212 with respect to the power transmission device 112 largely increases in the major axis direction of the central conductor 11.

In addition, the relationship $R1*3 > R2$ is satisfied. Thus, the degree of coupling is not substantially zero until the positional relationship between the power transmission device 112 and the power reception device 212 is maximally deviated at a limit position. When the deviation is smaller than the maximum deviation, the central conductors 11 and 21 at least partially face each other, and neither of the central conductors 11 and 21 faces (bridges) the peripheral conductor 22 or 12 at the other side. Thus, a deviation within the range of plus or minus 2R is also allowed in the minor axis direction.

Note that it is also applicable that the central conductor 21 of the power reception device 212 has an oblong shape, and the central conductor 11 of the power transmission device 112 has a circular shape.

[Seventh Embodiment]

Figure 11A:
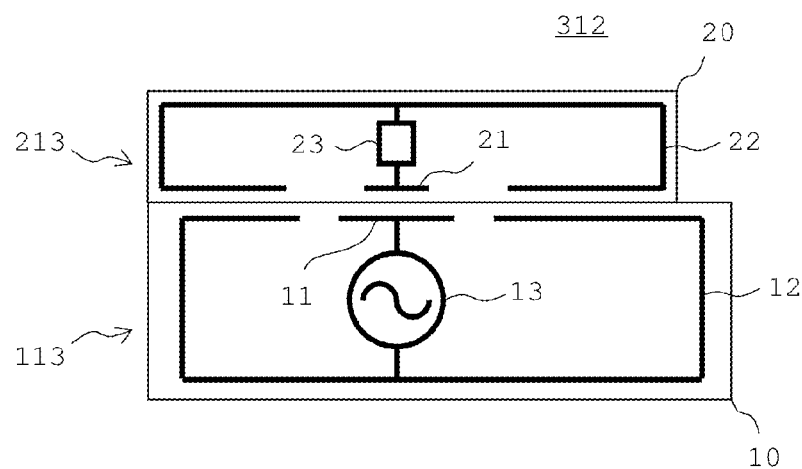
FIG. 11A is a cross-sectional view that conceptually shows a relevant portion of a power transfer system 312.
Figure 11B:
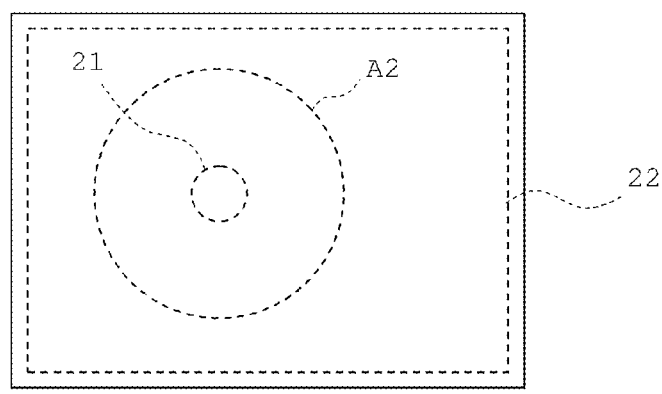
FIG. 11B is a bottom view of a power reception device 213.
Figure 11C:
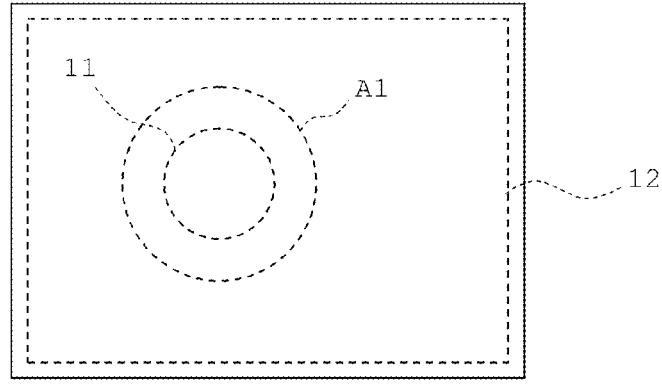
FIG. 11C is a top view of a power transmission device 113.

FIG. 11A is a cross-sectional view that conceptually shows a relevant portion of a power transfer system 312. FIG. 11B is a bottom view of a power reception device 213. FIG. 11C is a top view of a power transmission device 113. When illustrated in cross-sectional view, the power transfer system 312 is similar to the power transfer system 301 shown in FIG. 2A. As shown in FIG. 11B and FIG. 11C, the diameter of the central conductor 11 of the power transmission device 113 may be different from the diameter of the central conductor 21 of the power reception device 213. By so doing, it is possible to reduce variations in capacitance between the central conductors 11 and 21 due to a positional deviation of the power reception device 213 with respect to the power transmission device 113. In addition, the diameter of the opening A1 of the peripheral conductor 12 of the power transmission device 113 may be different from the diameter of the opening A2 of the peripheral conductor 22 of the power reception device 213. By so doing, it is possible to reduce variations in capacitance between the peripheral conductors 12 and 22 due to a positional deviation of the power reception device 213 with respect to the power transmission device 113. At this time, the diameter of the opening of the peripheral conductor of the device that includes the central conductor having a smaller diameter is larger than the diameter of the opening of the peripheral conductor of the device at the other side. This prevents the central conductor of the device at the other side from bridging between the central conductor and the peripheral conductor of the host device when the positions of both the devices are deviated. Thus, it is possible to prevent a steep decrease in degree of coupling due to a positional deviation.

[Eighth Embodiment]

Figure 12A:
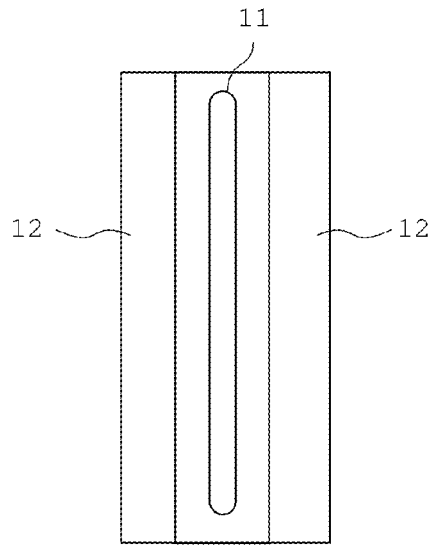
FIG. 12A is a view that shows an example of the pattern of central conductor 11 and peripheral conductors 12 of a power transmission device.
Figure 12B:
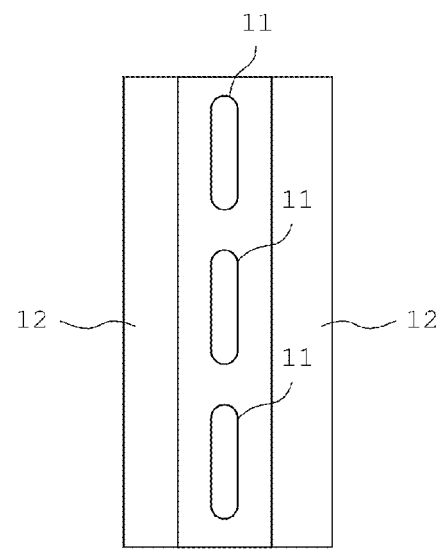
FIG. 12B is a view that shows an example of the pattern of central conductors 11 and peripheral conductors 12 of a power transmission device.
Figure 12C:
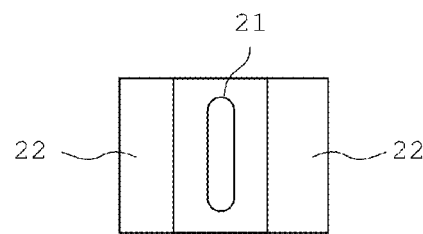
FIG. 12C is a view that shows an example of the pattern of central conductor 21 and peripheral conductors 22 of a power reception device.
Figure 12D:
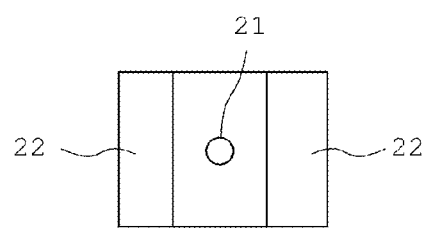
FIG. 12D is a view that shows an example of the pattern of central conductor 21 and peripheral conductors 22 of a power reception device.
Figure 12E:
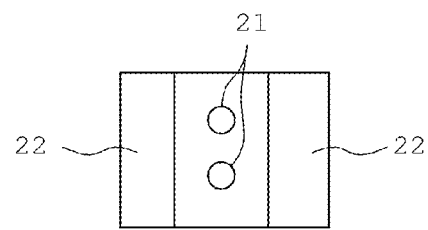
FIG. 12E is a view that shows an example of the pattern of central conductors 21 and peripheral conductors 22 of a power reception device.

FIG. 12A and FIG. 12B are views that show examples of the pattern of central conductors 11 and peripheral conductors 12 of a power transmission device. FIG. 12C, FIG. 12D and FIG. 12E are views that show examples of the pattern of central conductors 21 and peripheral conductors 22 of a power reception device.

As shown in FIG. 12A and FIG. 12B, the central conductor 11 of the power transmission device has a linear shape, and the peripheral conductors 12 are arranged respectively on both sides of the central conductor 11 at a predetermined distance from the central conductor 11. In addition, in correspondence with this configuration, the peripheral conductors 22 are arranged respectively on both sides of the central conductor 21 of the power reception device at a predetermined distance from the central conductor 21. By so doing, it is possible to largely increase the flexibility of arrangement of the power reception device with respect to the power transmission device against a deviation of the central conductor 11 in the major axis direction. Thus, it is possible to supply electric power to a circuit that moves in the major axis direction while it is moving.

As shown in FIG. 12B, the central conductor 11 may be separated in a discontinuous shape as long as variations in capacitance generated between the central conductor 11 and the central conductor 21 of the power reception device at the other side is not large. By so doing, it is possible to suppress an unnecessary capacitance between the central conductor 11 and the peripheral conductor 12.

In addition, the central conductor 21 of the power reception device may also have a circular shape or have a pattern of a plurality of circles as shown in FIG. 12D and FIG. 12E. By so doing, it is possible to suppress an unnecessary capacitance between the central conductor 21 and the peripheral conductor 22.

[Ninth Embodiment]

Figure 13:
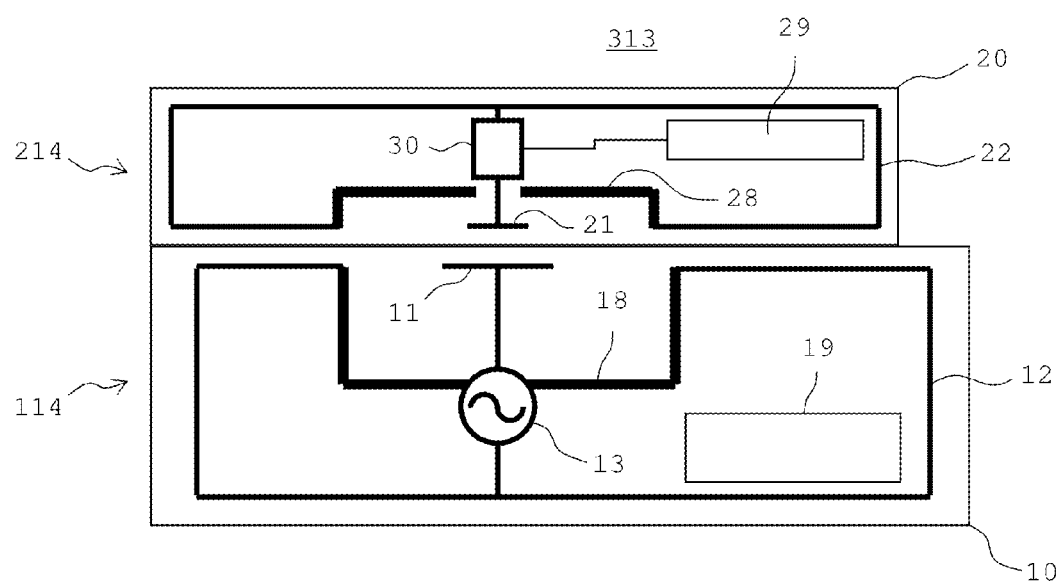
FIG. 13 is a view that shows the configuration of a power transfer system 313 according to a ninth embodiment.

FIG. 13 is a view that shows the configuration of a power transfer system 313 according to a ninth embodiment. The power transfer system 313 includes a power transmission device 114 and a power reception device 214. A shielding conductor 18 of a power transmission device 114 is provided so as to surround the active surface of the central conductor 11 and also surround the inside of the casing 10. A low-voltage circuit portion 19 is provided in a space that is shielded by the shielding conductor 18 and the peripheral conductor 12.

Similarly, in a power reception device 214 as well, a shielding conductor 28 is provided so as to surround the active surface of the central conductor 21 and also surround the inside of the casing 20. A low-voltage circuit portion 29 is provided in a space that is shielded by the shielding conductor 28 and the peripheral conductor 22.

On the other hand, an alternating voltage generating circuit 13 is arranged near the central conductor 11, and a rectifying smoothing circuit 30 is arranged near the central conductor 21.

In this way, high-voltage portions (the alternating voltage generating circuit 13 and the rectifying smoothing circuit 30) are put together around the central conductors 11 and 21, and the low-voltage circuit portions 19 and 29 are isolated from the high-voltage portions by the shielding conductors 18 and 28 and the peripheral conductors 12 and 22. Thus, it is possible to reduce the interference, received by the low-voltage circuit portions 19 and 29, due to fluctuations in electric field of the coupling portion at which the central conductors 11 and 21 face each other. Particularly, when the low-voltage circuit portions 19 and 29 are high-impedance circuits, they are susceptible to fluctuations in electric field of a high voltage; however, that problem may be eliminated with the above configuration.

Particularly, it is important not to generate a large stray capacitance at a connecting portion between the circuit inside the casing and the central conductor. Specifically, the following measures may be taken. The size of an electrode, other than the central conductors 11 and 21, to which a high voltage is applied is reduced as much as possible. Narrow wires are used to connect the high-voltage portions to the circuits. The narrow wires are extended out through openings provided respectively in the shielding conductors 18 and 28. The high-voltage portions are placed outside (inside, when viewed from the shielding conductors 18 and 28) the shielding conductors 18 and 28 to shield only the low-voltage portions. For example, when a step-up coil is used, the high-voltage portion of the step-up coil is placed outside the shielding conductor 18 or 28, and the low-voltage portion thereof is placed inside the shielding conductor 18 or 28. Particularly, a high-impedance portion is located away from the high-voltage portions and is electrostatically shielded. Note that the central conductors 11 and 21 may be arranged three-dimensionally using a printed wiring board, or the like.

[Tenth Embodiment]

Figure 14A:
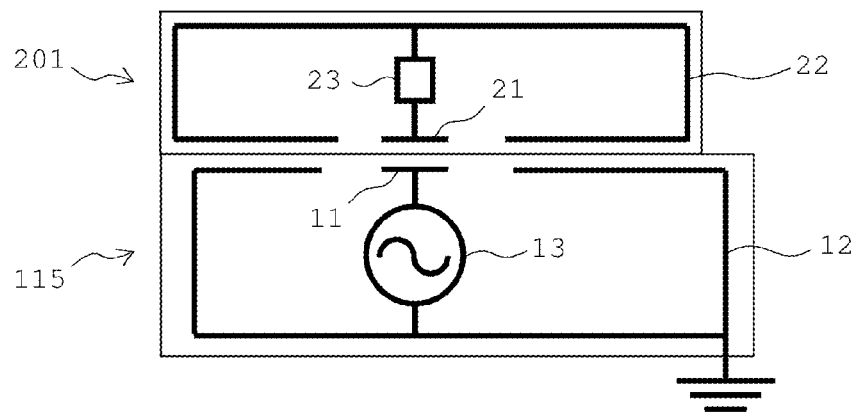
FIG. 14A is a view that shows configuration an example of a power transfer system 314 according to a tenth embodiment.
Figure 14B:
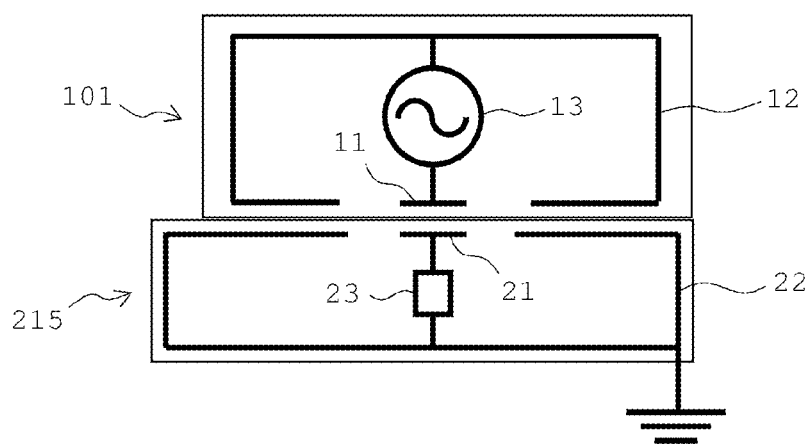
FIG. 14B is a view that shows configuration an example of a power transfer system 315 according to a tenth embodiment.

FIG. 14A and FIG. 14B are views that show configuration examples of two power transfer systems 314 and 315 according to a tenth embodiment. The power transfer system 314 shown in FIG. 14A includes a power transmission device 115 and a power reception device 201. A peripheral conductor 12 of the power transmission device 115 is grounded to an electric potential that is equal to an earth electric potential or substantially an earth electric potential. In addition, the power transfer system 315 shown in FIG. 14B includes a power transmission device 101 and a power reception device 215. A peripheral conductor 22 of the power reception device 215 is grounded to an electric potential that is equal to an earth electric potential or substantially equal to an earth electric potential. In this way, by grounding the peripheral conductor of each of the power transmission device side and the power reception device side, it is possible to stabilize the reference electric potential of the circuit and, as a result, the power transfer system is strong against a disturbance. In addition, because no high voltage is induced in the peripheral conductors, safety is improved.

In the above described embodiments, when the central conductors 11 and 21 and the peripheral conductors 12 and 22 are formed to be thin, these may be formed by die-cutting or etching a conductive foil, such as copper foil. Alternatively, these conductors may be formed of a conductive wire, such as copper, or a mesh, and, if there are no restrictions on size or process, these conductors may be formed three-dimensionally.

In addition, in the above described embodiments, the entire circuits are covered with the peripheral conductors 12 and 22; however, it is not necessary to cover the entire circuits with the peripheral conductors 12 and 22. Instead, only part of the circuits that influence transfer of electric power may be covered.

In addition, in the above described embodiments, the power transfer system is formed so that the power transmission device and the power reception device are stacked one above the other. The vertical arrangement may be opposite, or both devices may be arranged horizontally in proximity to each other.

REFERENCE SIGNS LIST

A1, A2 opening
C smoothing capacitor
D1, D2 rectifier diode
T transformer
10D concave portion
10S convex portion
10 casing
11A, 11B, 11C central conductor
11, 21 central conductor
12,22 peripheral conductor
13 alternating voltage generating circuit
13A, 13B, 13C alternating voltage generating circuit
16, 26 magnet
17 dielectric sheet
17C, 17P, 27C, 27P dielectric sheet
18, 28 shielding conductor
19, 29 low-voltage circuit portion
20D concave portion
20S convex portion
20 casing
21 central conductor
22 peripheral conductor
23 load circuit
24 metal casing
27 dielectric sheet
28 shielding conductor
29 low-voltage circuit portion
30 rectifying smoothing circuit
31 control circuit
32 secondary battery
33 auxiliary alternating voltage generating circuit
101 to 106 power transmission device
108 to 116 power transmission device
201 to 215 power reception device
203A, 203B, 203C power reception device
301 to 316 power transfer system

The invention claimed is:

1. A power transfer system comprising:
a power transmission device having a power transmission capacitive coupling electrode that includes a power transmission central conductor and a power transmission peripheral conductor that is arranged at a position surrounding the power transmission central conductor or at positions placing the power transmission central conductor in between in an insulated state from the power transmission central conductor;
a power reception device having a power reception capacitive coupling electrode that includes a power reception central conductor and a power reception peripheral conductor that is arranged at a position surrounding the power reception central conductor or at positions placing the power reception central conductor in between in an insulated state from the power reception central conductor;
an alternating voltage generating circuit that generates an alternating voltage that is applied between the power transmission central conductor and the power transmission peripheral conductor; and
a load circuit of electric power induced between the power reception central conductor and the power reception peripheral conductor.

2. The power transfer system according to claim 1, wherein one of the power transmission peripheral conductor and the power reception peripheral conductor is a casing that is electrically continuous with a reference electric potential of one of the power transmission device and the power reception device.

3. The power transfer system according to claim 1, wherein, in a state where the power transmission device and the power reception device are placed in a predetermined positional relationship, a capacitance between the power transmission central conductor and the power reception central conductor is larger than a first capacitance between the power transmission central conductor and the power transmission peripheral conductor and larger than a second capacitance between the power reception central conductor and the power reception peripheral conductor.

4. The power transfer system according to claim 1, wherein the power transmission central conductor and the power transmission peripheral conductor are aligned substantially in the same plane.

5. The power transfer system according to claim 1, wherein the power reception central conductor and the power reception peripheral conductor are aligned substantially in the same plane.

6. The power transfer system according to claim 1, further comprising a first engagement device on a casing of the power transmission device and a second engagement device on a casing of the power reception device, wherein the first and second engagement devices engage with each other in a predetermined positional relationship.

7. The power transfer system according to claim 1, wherein at least one of the power transmission device and the power reception device has a dielectric layer on a surface of at least one of the power transmission central conductor, the power transmission peripheral conductor, the power reception central conductor and the power reception peripheral conductor.

8. The power transfer system according to claim 1, wherein a diameter of the power transmission peripheral conductor is about three times as large as the diameter of the power transmission central conductor.

9. The power transfer system according to claim 1, wherein a diameter of the power reception peripheral conductor is about three times as large as the diameter of the power reception central conductor.

10. The power transfer system according to claim 1, wherein the power transmission central conductor and the power reception central conductor have different shapes.

11. The power transfer system according to claim 1, wherein the power transmission central conductor and the power reception central conductor have a similar shape.

12. The power transfer system according to claim 1, wherein the power transmission central conductor has a substantially linear shape or a substantially partially linear shape, and the power transmission peripheral conductor is located on each side of the power transmission central conductor at substantially a constant distance therefrom.

13. The power transfer system according to claim 1, wherein the power reception central conductor has a substantially linear shape or a substantially partially linear shape, and the power reception peripheral conductor is located on each side of the power reception central conductor at substantially a constant distance therefrom.

14. The power transfer system according to claim 1, wherein the power transmission device includes a low-voltage circuit portion in addition to the alternating voltage generating circuit, and the low-voltage circuit portion is shielded by a shielding conductor that includes the power transmission peripheral conductor.

15. The power transfer system according to claim 14, wherein the load circuit includes a rectifying smoothing circuit that rectifies and smoothes an alternating voltage induced between the power reception central conductor and the power reception peripheral conductor and a low-voltage circuit portion that operates on a voltage output from the rectifying smoothing circuit, wherein the low-voltage circuit portion is shielded by a power reception shielding conductor that includes the power reception peripheral conductor.

16. The power transfer system according to claim 1, wherein the load circuit includes a rectifying smoothing circuit that rectifies and smoothes an alternating voltage induced between the power reception central conductor and the power reception peripheral conductor and a low-voltage circuit portion that operates on a voltage output from the rectifying smoothing circuit, wherein the low-voltage circuit portion is shielded by a shielding conductor that includes the power reception peripheral conductor.

17. The power transfer system according to claim 1, wherein one of the power transmission peripheral conductor and the power reception peripheral conductor is grounded to an earth electric potential or an electric potential that is substantially equal to an earth electric potential.

18. The power transfer system according to claim 1, further comprising at least one first magnet located within the power transmission device, and at least one second magnet located within the power reception device, the at least one first magnet and the at least one second magnet being positioned so as to align the power transmission central conductor with the power reception central conductor when attracted to each other.

* * * * *